United States Patent
Machado et al.

(10) Patent No.: US 12,493,699 B2
(45) Date of Patent: Dec. 9, 2025

(54) AUTHORIZING MODIFICATIONS OF PROTECTED UEFI VARIABLES

(71) Applicant: Lenovo (Singapore) Pte. Ltd., Singapore (SG)

(72) Inventors: Rafael Rodrigues Machado, Sorocaba (BR); Igor Stolbikov, Apex, NC (US); Scott Wentao Li, Cary, NC (US); Denis Leite Gomes, Campinas (BR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 224 days.

(21) Appl. No.: 18/324,568

(22) Filed: May 26, 2023

(65) Prior Publication Data

US 2024/0394370 A1    Nov. 28, 2024

(51) Int. Cl.
    *G06F 21/57*     (2013.01)
    *G06F 21/60*     (2013.01)
    *G06F 21/62*     (2013.01)

(52) U.S. Cl.
    CPC .......... *G06F 21/572* (2013.01); *G06F 21/602* (2013.01); *G06F 21/6227* (2013.01); *G06F 2221/033* (2013.01)

(58) Field of Classification Search
CPC .. G06F 21/572; G06F 21/602; G06F 21/6227; G06F 2221/033
See application file for complete search history.

(56) References Cited

U.S. PATENT DOCUMENTS

| | | | | |
|---|---|---|---|---|
| 8,516,022 B1 * | 8/2013 | Kanteti | ................. | G06F 16/181 707/827 |
| 8,762,712 B1 * | 6/2014 | Kwan | ................... | H04L 9/0825 713/165 |
| 11,275,825 B1 * | 3/2022 | Kapinos | ................ | H04L 9/0894 |
| 2010/0122250 A1 * | 5/2010 | Challener | ................. | G06F 8/61 718/1 |
| 2015/0089238 A1 * | 3/2015 | Lewis | ................... | H04L 9/3236 713/183 |
| 2020/0226680 A1 * | 7/2020 | Kohnhorst | ............. | G06Q 40/04 |
| 2022/0091578 A1 * | 3/2022 | Ross | ........................ | G09C 5/00 |

* cited by examiner

*Primary Examiner* — Ayoub Alata
(74) *Attorney, Agent, or Firm* — FERENCE & ASSOCIATES LLC (57) ABSTRACT

One embodiment provides a method, the method including: receiving, from a device and utilizing a variable modification system, a request to make a modification to content of a protected unified extensible firmware interface (UEFI) variable; verifying, using the variable modification system, an entity utilizing the device and requesting the modification is authorized to make modifications to the content of the protected UEFI variable; and authorizing, responsive to verifying the entity is an authorized entity and using an encryption scheme associated with the protected UEFI variable, the modification, wherein the authorization results in the modification to the content of the protected UEFI. Other aspects are claimed and described.

20 Claims, 4 Drawing Sheets

AUTHORIZING MODIFICATIONS OF PROTECTED UEFI VARIABLES

BACKGROUND

Unified Extensible Firmware Interface (UEFI), also referred to as EFI, is an interface that connects a firmware of a device to an operating system (OS) of the device. Every utility that is to be loaded or launched by UEFI must be an EFI application that corresponds to the UEFI firmware architecture. Within the UEFI framework, different variables may be utilized. Generally, there are two types of UEFI variables, those used by the bootloader and UEFI runtime variables. The UEFI variables allow for flexibility in definition, with some of them able to be changed during an OS runtime, some of them able to be changed by a user of a device, and/or the like. A program developer, entity controlling a device (e.g., an employer who assigns devices to employees, information technology groups setting up devices for users, etc.), and/or the like, may want some variables to remain unchanged. Thus, the UEFI framework allows for UEFI variables to be protected UEFI variables. These protected UEFI variables are locked and do not allow modification without performing some sort of unlocking of the protected variable. For example, these variables may have to be decrypted using an encryption algorithm before they are unlocked and can thereafter be modified.

BRIEF SUMMARY

In summary, one aspect provides a method, the method including: receiving, from a device and utilizing a variable modification system, a request to make a modification to content of a protected unified extensible firmware interface (UEFI) variable; verifying, using the variable modification system, an entity utilizing the device and requesting the modification is authorized to make modifications to the content of the protected UEFI variable; and authorizing, responsive to verifying the entity is an authorized entity and using an encryption scheme associated with the protected UEFI variable, the modification, wherein the authorization results in the modification to the content of the protected UEFI.

Another aspect provides an system, the system including: a processor; a memory device that stores instructions that, when executed by the processor, causes the system to: receive, from a device and utilizing a variable modification system, a request to make a modification to content of a protected unified extensible firmware interface (UEFI) variable; verify, using the variable modification system, an entity utilizing the device and requesting the modification is authorized to make modifications to the content of the protected UEFI variable; and authorize, responsive to verifying the entity is an authorized entity and using an encryption scheme associated with the protected UEFI variable, the modification, wherein the authorization results in the modification to the content of the protected UEFI.

A further aspect provides a product, the product including: a computer-readable storage device that stores executable code that, when executed by a processor, causes the product to: receive, from a device and utilizing a variable modification system, a request to make a modification to content of a protected unified extensible firmware interface (UEFI) variable; verify, using the variable modification system, an entity utilizing the device and requesting the modification is authorized to make modifications to the content of the protected UEFI variable; and authorize, responsive to verifying the entity is an authorized entity and using an encryption scheme associated with the protected UEFI variable, the modification, wherein the authorization results in the modification to the content of the protected UEFI.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While the use of protected UEFI variables is useful, variables are generally identified as protected when a device is developed. However, some end users are savvy enough to change or modify UEFI variables so that the device performs specific desired functions. Thus, the developer generally leaves most UEFI variables unlocked so that end users can modify the variables. For example, by leaving the UEFI variables unlocked, system administrators are allowed to make modifications to the variables so that the device performs some desired and legitimate function, for example, management of firmware applications, management of basic input/output system (BIOS) functions, and/or the like. However, by leaving these variables unlocked, the device is left vulnerable to attacks by entities that change the UEFI variables and compromise the firmware and corrupt the UEFI variables.

Conventionally, the developer utilizes protected variables but ends up generally only protecting those variables whose content would only be changed during a BIOS update. This means that the compilation environment that would sign the BIOS image has access to the private key or other mechanism utilized to unlock the protected variables. Generally, this is satisfactory because the compilation environment is trusted. However, for UEFI variables that need to be changed dynamically, or outside of BIOS updates, these variables are generally left unlocked because conventionally there is not a technique for protecting these variables without compromising the security of the private key or other mechanism that would be necessary for unlocking these variables. In an effort to keep the private key or other mechanism secure, the variables that may be dynamically changed outside of a BIOS update are left unprotected. Leaving these variables unprotected, as previously mentioned, leaves these variables open to attack, which leaves the device vulnerable.

Accordingly, the described system and method provides a technique for authorizing a modification to content of a protected UEFI variable of a device utilizing a variable modification system that authorizes the modification upon verifying the entity utilizing a device is authorized to make modifications to the content of the protected UEFI variable. The system utilizes multiple parties to securely unlock protected variables, and particularly, variables that may need to be changed dynamically. The variable modification system receives a request from a device to make a modification to content of a protected unified extensible firmware interface (UEFI) variable. The request may be received from the device having the UEFI variables to be modified or may be received from an intermediary device that interfaces between the device having the UEFI variables to be modified and a trusted and secure location performing an authorization of the modification. Thus, the request may be received at the trusted and secure location.

Upon receiving the request, the variable modification system may verify an entity that is utilizing the device and requesting the modification is authorized to make modifications to the content of the protected UEFI variable. The trusted and secure location may be a component of the variable modification system and may be the component that makes the verification. In verifying the entity is authorized to make modifications, the variable modification system may compare credentials of the entity to a list of authorized entities. Upon verifying the entity is an authorized entity, the variable modification system may authorize the modification using an encryption scheme associated with the protected UEFI variable. In other words, the variable modification system may utilize an unlocking mechanism that is needed to unlock the protected variable. This authorization allows the modification to the content of the protected UEFI variable. In other words, when the authorization is provided to the device, the device can either utilize the authorization to make the modification to the protected variable itself or can transmit the authorization to another device so that the modification can be made to the protected variable of the another device.

Therefore, a system provides a technical improvement over traditional methods for protecting UEFI variables. Instead of simply protecting UEFI variables that are only changed during BIOS updates, the described system allows a technique where many more UEFI variables, including those that are dynamically changed during device operation, can be protected. The described system does not require that the mechanism that is utilized to unlock the protected variables to be stored on the device and instead stores that mechanism at a secure and trusted location. Thus, unlocking mechanism is not at a location that can be compromised along with the UEFI variables. The secure and trusted location can receive a request to make the modification and validate the requesting entity to ensure that the integrity and security of the system is not compromised. Since the trusted and secure location can be accessed at any time and authorize modifications to protected variables, this system can be utilized to protect many more variables while still maintaining the security of the unlocking mechanism for the protected variables. Thus, the system provides more flexibility in utilization of protected UEFI variables than the conventional systems in which only variables that are modified during a BIOS update can be protected. Additionally, by allowing for many more UEFI variables to be protected, the described system provides more security to UEFI variables, firmware, BIOS, and device itself than the conventional systems.

The illustrated example embodiments will be best understood by reference to the figures. The following description is intended only by way of example, and simply illustrates certain example embodiments.

Figure 1:
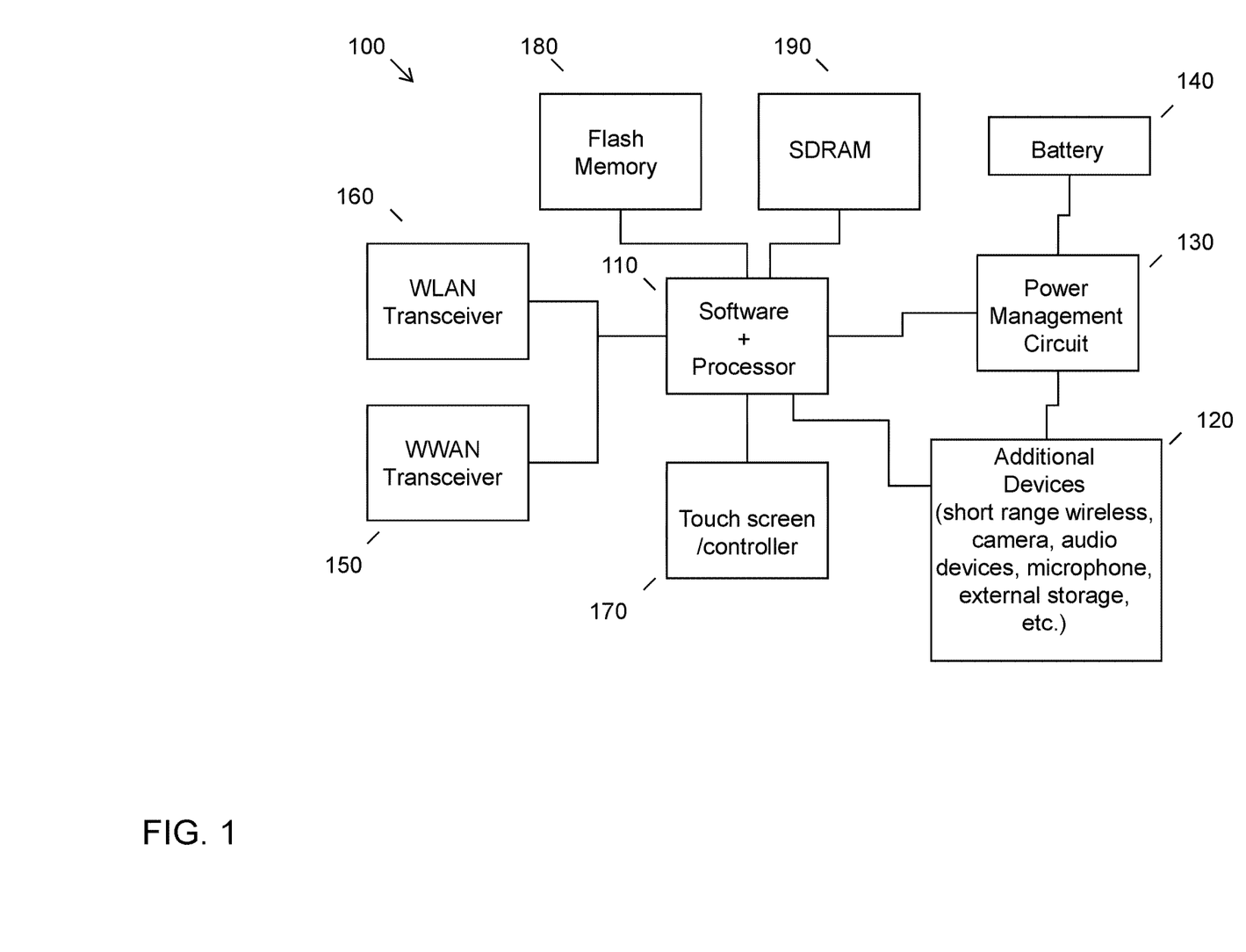
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, input/output (I/O) ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use serial advanced technology attachment (SATA) or peripheral component interconnect (PCI) or low pin count (LPC). Common interfaces, for example, include secure digital input/output (SDIO) and inter-integrated circuit (I2C).

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply basic input/output system (BIOS) like functionality and dynamic random-access memory (DRAM) memory.

System 100 typically includes one or more of a wireless wide area network (WWAN) transceiver 150 and a wireless local area network (WLAN) transceiver 160 for connecting to various networks, such as telecommunications networks and wireless Internet devices, e.g., access points. Additionally, devices 120 are commonly included, e.g., a wireless communication device, external storage, etc. System 100 often includes a touch screen 170 for data input and display/ rendering. System 100 also typically includes various memory devices, for example flash memory 180 and synchronous dynamic random-access memory (SDRAM) 190.

Figure 2:
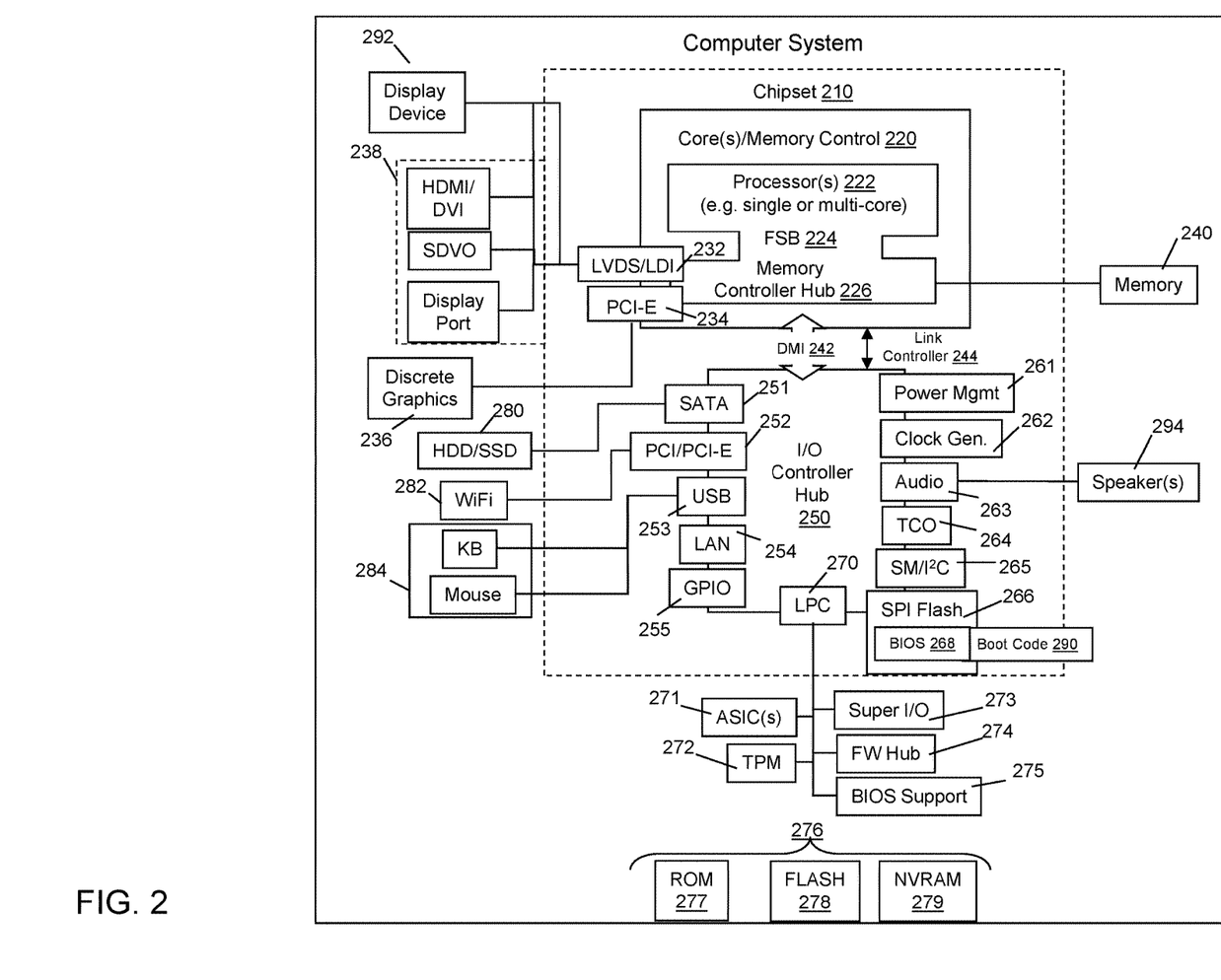
FIG. 2 illustrates another example of information handling device circuitry.

FIG. 2 depicts a block diagram of another example of information handling device circuits, circuitry or components. The example depicted in FIG. 2 may correspond to computing systems such as personal computers, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of random-access memory (RAM) that may be referred to as "system memory" or "memory"). The memory controller hub 226 further includes a low voltage differential signaling (LVDS) interface 232 for a display device 292 (for example, a cathode-ray tube (CRT), a flat panel, touch screen, etc.). A block 238 includes some technologies that may be supported via the low-voltage differential signaling (LVDS) interface 232 (for example, serial digital video, high-definition multimedia interface/digital visual interface (HDMI/DVI), display port). The memory controller hub 226 also includes a PCI-express interface (PCI-E) 234 that may support discrete graphics 236.

In FIG. 2, the I/O hub controller 250 includes a SATA interface 251 (for example, for hard-disc drives (HDDs), solid-state drives (SSDs), etc., 280), a PCI-E interface 252 (for example, for wireless connections 282), a universal serial bus (USB) interface 253 (for example, for devices 284 such as a digitizer, keyboard, mice, cameras, phones, microphones, storage, other connected devices, etc.), a network interface 254 (for example, local area network (LAN)), a general purpose I/O (GPIO) interface 255, a LPC interface 270 (for application-specific integrated circuit (ASICs) 271, a trusted platform module (TPM) 272, a super I/O 273, a firmware hub 274, BIOS support 275 as well as various types of memory 276 such as read-only memory (ROM) 277, Flash 278, and non-volatile RAM (NVRAM) 279), a power management interface 261, a clock generator interface 262, an audio interface 263 (for example, for speakers 294), a time controlled operations (TCO) interface 264, a system management bus interface 265, and serial peripheral interface (SPI) Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices, which may be used in systems that utilize protected UEFI variables, systems that can securely store unlocking mechanisms for protected variables, and/or the like. For example, the circuitry outlined in FIG. 1 may be implemented in a tablet or smart phone embodiment, whereas the circuitry outlined in FIG. 2 may be implemented in a personal computer embodiment.

Figure 3:
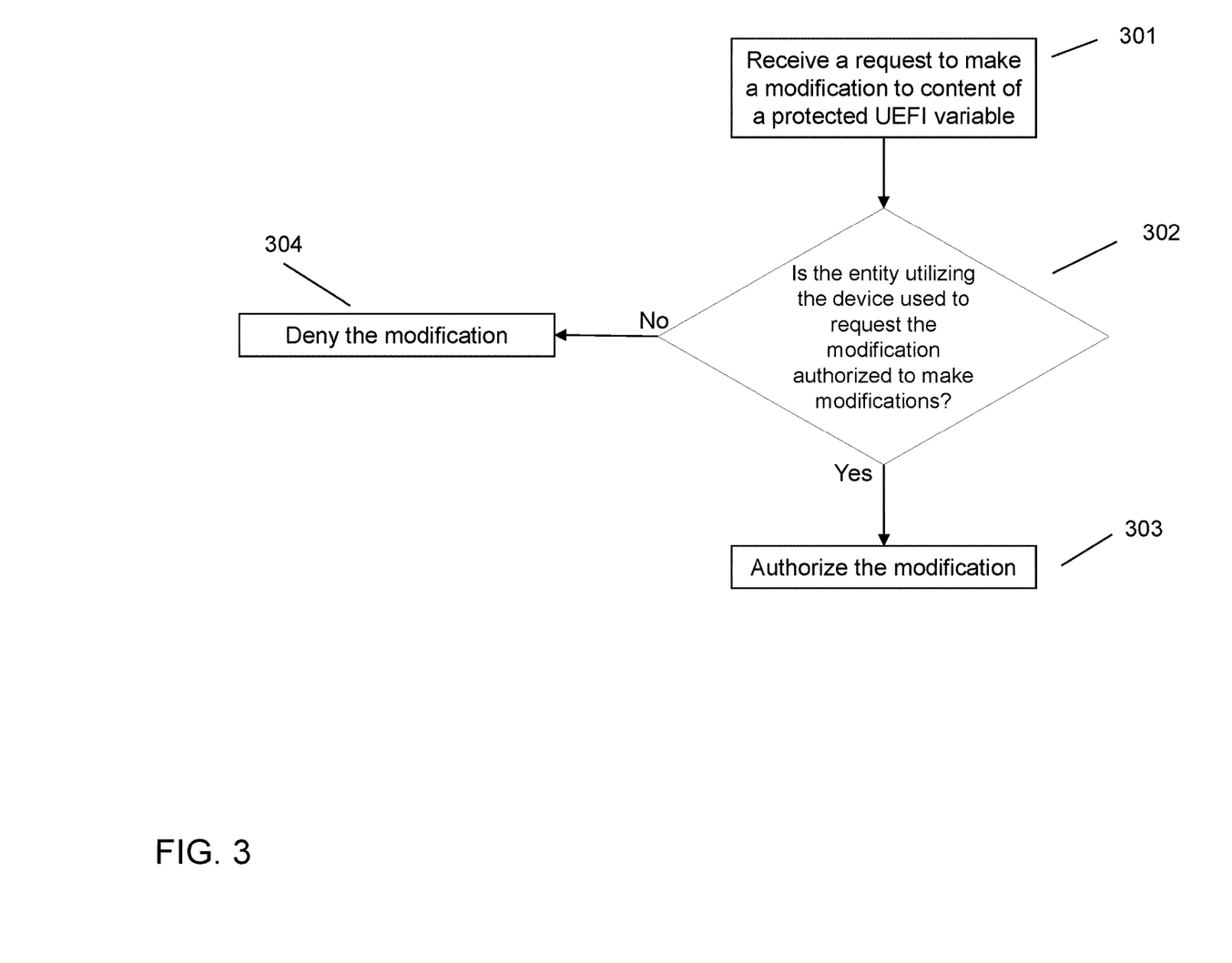
FIG. 3 illustrates an example method for authorizing a modification to content of a protected UEFI variable of a device utilizing a variable modification system that authorizes the modification upon verifying the entity utilizing a device is authorized to make modifications to the content of the protected UEFI variable.

FIG. 3 illustrates an example method for authorizing a modification to content of a protected UEFI variable of a device utilizing a variable modification system that authorizes the modification upon verifying the entity utilizing a device is authorized to make modifications to the content of the protected UEFI variable. The method may be implemented on a system which includes a processor, memory device, output devices (e.g., display device, printer, etc.), input devices (e.g., keyboard, touch screen, mouse, microphones, sensors, biometric scanners, etc.), image capture devices, and/or other components, for example, those discussed in connection with FIG. 1 and/or FIG. 2. While the system may include known hardware and software components and/or hardware and software components developed in the future, the system itself is specifically programmed to perform the functions as described herein to authorize and make modifications to protected UEFI variables. Additionally, the variable modification system includes modules and features that are unique to the described system.

The variable modification system may include one or more components that are individually or in combination utilized to perform steps of the described system. One component of the variable modification system may be a secure location for storage of the unlocking mechanism that is utilized to unlock protected UEFI variables. The secure location may be a cloud storage and processing location, remote storage and processing location, network storage and processing location, and/or the like. The secure location may also perform the verification of the entity requesting the modification and authorization of the modification. The secure location or variable modification system may also utilize other components or sub-components to perform these steps. The components may also interface with other components, for example, an authorization storage component that stores a list of authorized entities and information corresponding to the authorized entities, for example, a listing of devices a given of the authorized entities is allowed to modify, a listing of protected variables a given of the authorized entities is allowed to modify, and/or any other type of information that may be necessary to determine whether an entity is authorized to perform a UEFI variable modification on a device.

Different components of the variable modification system may be located on different devices. For example, some components may be located at the trusted and secure location, whereas other components may be located on a device that is making the request to make a modification to a protected variable. These components located on different device may collectively make up the variable modification system. Additionally, these disparately located components may have the capability to communicate with each other.

This communication may only occur across trusted and authorized communication channels, so this communication may only be allowed once the trusted and authorized communication channels are established. Upon termination of these communication channels, the ability for the components to communicate may also be terminated until the channels are reactivated.

The variable modification system may run in the background of an information handling device and may be activated when the device is activated. Additionally, or alternatively, the system may be activated when an application associated with the variable modification system or a protected UEFI variable is activated, detected, or otherwise opened. For example, the variable modification system may not be activated until a user attempts to make a modification to a protected UEFI variable.

Once the variable modification system is activated on a device, the system may be utilized throughout the process of receiving a request to make a modification to the content of a protected variable, verifying the entity requesting the modification is authorized to perform such modifications, authorizing the modification, and/or any other steps that may be necessary for carrying out the described system and method.

At 301, a request to make a modification to content of a protected unified extensible firmware interface (UEFI) variable may be received from a device. The request may be received at a component of a variable modification system. The request may be received over a secure and possibly encrypted communication channel that is established between the variable modification system and the device. This may assist in ensuring that communications and transmissions occurring across the channel are secure and the integrity is not compromised. The component may be a secure and trusted location that stores unlocking mechanisms that can be utilized to unlock protected variables. The secure and trusted location may also perform the verification step that will be discussed in more detail with respect to 302 and/or the authorization step that will be discussed in more detail with respect to 303. However, one or more of these steps may be performed by or utilizing other components of the variable modification system. Thus, the discussion will refer to the use of the variable modification system when performing these steps and it should be understood that the same or different components of the variable modification system may perform one or more of the described steps.

The request may be responsive to a device, which may be the same device that generated and transmitted the request to the variable modification system or may be a different device, wanting to make a modification to content of one or more protected UEFI variables within the device. For ease of readability, the device that has generated and transmitted the request will be referred to as the transmitting device or intermediary device. In the case that the transmitting device is not the device for which the protected variable content is to be modified, the device for which the protected variable content is to be modified will be referred to as the modifying device or second device. Upon determining that a device is attempting to change the content of a protected variable, the content will be bundled in a request and transmitted to the variable modification system.

The request may not only include the content to be used to change the protected variable, but may also include additional information. For example, the request may identify what for what device the protected variable is to be modified. As another example, the request may identify the protected variable that is to be modified. As another example, the request may identify the application attempting to change the protected variable or where on the device the request originated. The request may also include any additional information that is necessary for effectuating the modification and/or authorization of the request.

At 302, the system may determine if the entity utilizing the device used to request the modification authorized to make such modifications. In other words, the system determines if the request is coming from an authorized source. Stated differently, the system verifies that the entity utilizing the device and requesting the modification is authorized to make modifications to the content of the protected UEFI variable. To make this determination the request may include credentials of the user or entity that is making the request. It should be noted that the credentials may not be included in the request, but rather associated with the request. For example, the user or entity may log into the variable modification system utilizing credentials. Upon successfully logging into the variable modification system, the user or entity may thereafter be identified or verified as an entity that is authorized to make modifications. Thus, any requests originating from that entity will be marked or otherwise identified as being from an authorized entity. In this example, the verification performed at 302 may simply be a verification that the user or entity sending the request is logged into the variable modification system. The user may also have to log into the variable modification system, or provide additional authentication into the system, when the request is transmitted. For example, even though the user or entity is already logged into the system, upon attempted transmission of the request, the entity may have to re-log into the system, may have to provide a password, may have to provide a randomly generated code that is located on a device of the entity, and/or the like. This may provide an extra layer of security.

The verification may also be performed at the time of the request. For example, instead of logging into the variable modification system and then transmitting a request, the entity may log into the system while transmitting the request. In other words, when the request is transmitted, the entity may provide credentials for logging into the system. This provision of credentials may not only ensure transmission of the request, but may also log the entity into the variable modification system. The verification may not be solely based upon credentials provided by the entity. The verification may also be based upon identification of a device the entity is utilizing to provide the request. Thus, with the request, a device identifier, device associations, and/or any other identifying information may be provided. As with the entity, the device information may be utilized by the system to determine if the device is an authorized device, meaning the request was initiated by a device authorized to make such requests.

To verify the entity and/or device, the system may compare the information received from and corresponding to the entity and/or device to a datastore of authorized entities and/or devices. This datastore may be or may include an authorized entity list that identifies entities that are allowed to make modifications to protected variables. A match indicates that the entity and/or device is authorized to make modifications to protected variables. A non-match indicates that the entity and/or device is not authorized to make modifications to protected variables. In the event of a non-match, the entity and/or device could take steps to provide additional authentication that may be used by the system to verify the entity and/or device is authorized to make modifications to protected variables. Upon successfully providing additional authentication, which may include, but is not limited to, additional credential information, additional authentication questions and/or answers, transmission of a verifying request to an authorized entity to provide input regarding whether the transmitting entity and/or device should be authorized, and/or the like, the system may add the entity and/or device to the datastore for future verifications.

Within the data store, the system may also identify what types of protected variables the entity and/or device can modify, what types or which specific devices the entity and/or device can modify the protected variables of, how many requests the entity and/or device can make before additional steps must be taken, and/or the like. In other words, there may be levels of authorization within the data store. The different levels of authorization may give some authorized entities and/or devices the ability to successfully make some modifications but not the ability to make other modifications. The levels of authorization may be determined by an overarching entity that controls the variable modification system, developer of the modifying device, and/or the like, and may be made on a per entity and/or per device basis. These authorization levels may be changed over time, with some entities and/or devices being added, authorization levels being changed for some entities and/or devices, entities and/or devices being removed, and/or the like.

If the variable modification system determines that the entity and/or device is not authorized to make the modification at 302, the system may deny the modification at 304. This may occur if the entity and/or device cannot be authorized or verified by the system. A denial of the modification may also occur if the entity and/or device is not authorized to perform the specific modification being requested. In other words, the entity and/or device may be authorized to make some modifications, but not the specific modification being requested. For example, the entity may not be authorized to change the identified protected variable. As another example, the entity may not be authorized to make changes on the modifying device.

If, on the other hand, the variable modification system verifies that the entity utilizing the transmitting device and requesting the modification is authorized to make modifications to the content of the protected UEFI variable at 302, the system may authorize the modification at 303. In other words, the system may authorizing the modification responsive to verifying the entity is an authorized entity. Authorizing the modification includes using an encryption scheme associated with the protected UEFI variable. In other words, the authorization includes using an unlocking mechanism that can unlock the protected variable and made the modification to the protected variable. This may include encrypting the request and adding a signature to the request that indicates to the modifying device that the modification can be made. Thus, the variable modification system may sign the request and then send the signed request back to the modifying device, which may be via the intermediary device if applicable.

Since the modifying device has to be able to utilize the signed request, the request is signed utilizing an encryption mechanism that is decryptable by the protected variable. However, since other components of the transmitting device may not only communicate with the UEFI protected variable, but may also be compromised, the request is encrypted so that the compromised components are unable to read the signed request and/or mimic the signed request. Thus, the variable modification system may utilize a public-private key encryption scheme. Other encryption schemes could also be used and provide the same results and these are not intended to be excluded from use within the described system and method.

In the public-private key encryption scheme, the trusted and secure location stores both a public key and a private key. The private key is only held in the secure and trusted location or other secure and trusted locations. The public key is one that is accessible or known to the transmitting device and may even be generated by the transmitting device. The secure and trusted location signs the request for modification using a signature generated from the private and public keys, thereby encrypting the request. Once this encrypted request reaches the protected variable, UEFI framework, firmware, or BIOS of the transmitting device, the public key of the transmitting device can be used to verify the signature and unlock the protected variable so that the modification can be implemented.

It should be noted that the secure and trusted location does not have to open the request or know what protected variables are being modified. The secure and trusted location does not even need to know the modification that is being requested. Rather, the secure and trusted location may simply verify that the entity requesting the modification is authorized to perform the modification and upon a successful verification may then sign the request and send it back. Thus, in this example, the content of the request is kept secret from the secure and trusted location. However, this is not strictly necessary, and the secure and trusted location may access the content of the request, for example, within the verification step, as previously discussed.

The system may also assign a time period for which the transaction must be executed. This may mean that when a request is received, it is time stamped. If a time period has been assigned, the system must make the verification and authorize the request within the time period. This ensures that old requests are not authorized. Assigning a time period may also include assigning a time period for which the modification is to be completed. In other words, the system may set an expiration date and/or time for the authorization. If the device attempts to utilize a signed request after it has expired, the modification will be unsuccessful and a new request will need to be sent and authorized. In other words, an attempt to execute the modification after expiration of the time period results in a denial of the modification. This helps to ensure that a previously authorized modification is not attempted to be used again or that a nefarious device did not intercept the authorized request and make changes to it.

As previously mentioned, an intermediary device may be utilized to make requests to change protected variables of a modifying device. In this case, the intermediary device acts as an interface between the trusted and secure location and the second or modifying device. The intermediary device will make the request and receive the signed request from the trusted and secure location. The intermediary device then utilizes this signed request to facilitate the modification to the protected variable on the modifying device. Facilitating the modification may include simply forwarding the signed request to the modifying device. It may also include instructions for how the signed request is to be utilized in making the modification. The modifying or second device may then decrypt the signed request using the public key of the second device and effectuate the modification to the protected variable.

The use of an intermediary device allows for a single authorized entity and/or device to make modifications to other devices. The single authorized entity and/or device may be one that is identified as competent to perform modifications of protected variables. In order to increase the security and integrity of the system, the second device and intermediary device may communicate utilizing a secure and/or authenticated communication channel. The secure and/or authenticated communication channel may also be encrypted to help ensure the security of any communications and/or transmissions that are transmitted across the communication channel. Any transmission of information occurs over this channel and deactivation of the secure communication channel cuts off the transmission of information, including signed requests, between the second device and the intermediary device. Establishing the authenticated communication channel may be performed using one or more techniques. One example technique is the use of a QR (quick read) code. One of the intermediary or the second device may generate the QR code and the other device scans the generated QR code. This establishes the communication channel. Other techniques for establishing authenticated communication channels are contemplated and possible, for example, utilizing near field communication authentication, utilizing wireless authentication, utilizing radio frequency identification (RFID) transmissions, and/or the like.

Figure 4:
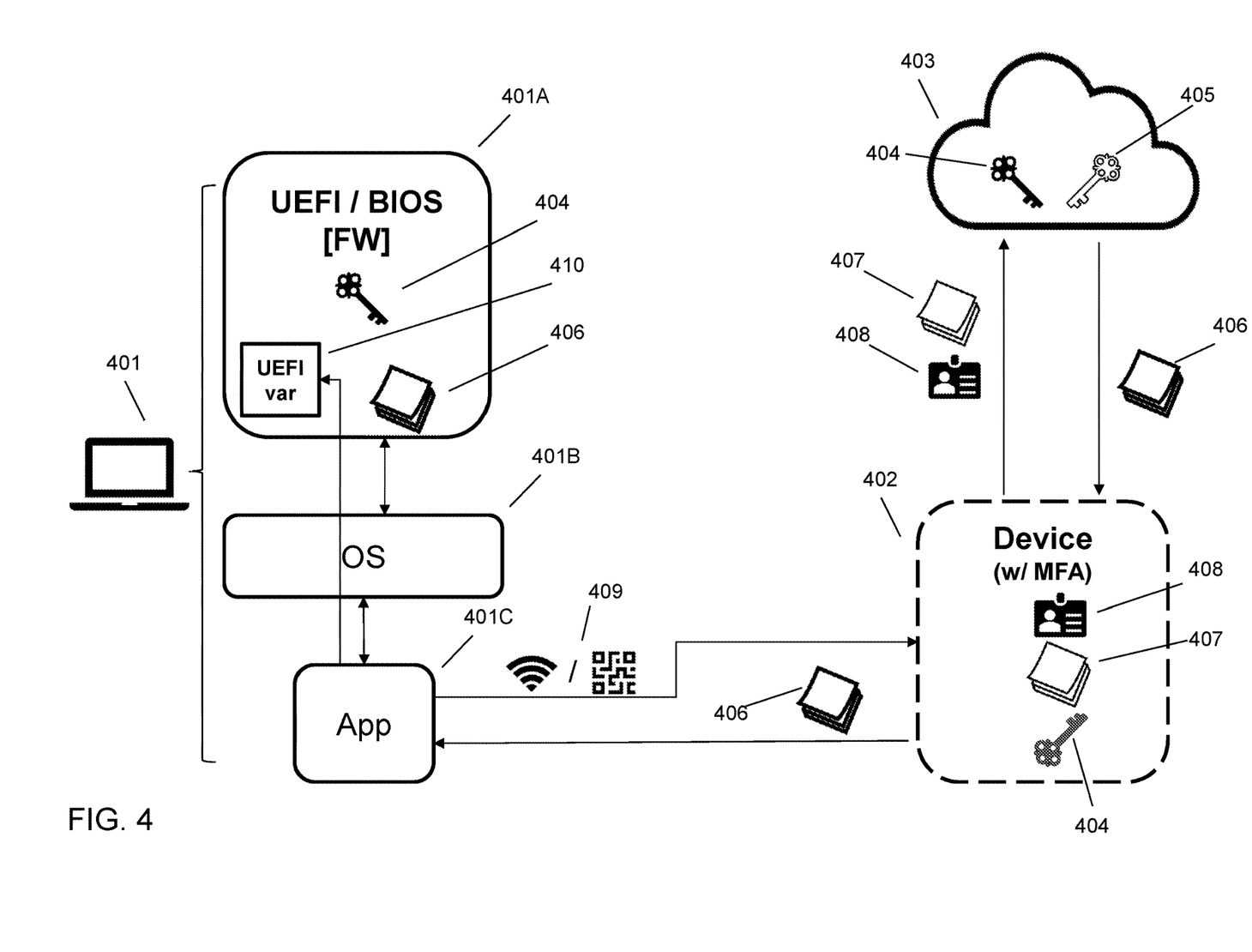
FIG. 4 illustrates an example system flow for authorizing modifications to a protected UEFI variable.

An example system flow for submitting a request and receiving an authorization utilizing an intermediary device is illustrated in FIG. 4. An example scenario where the system illustrated in FIG. 4 may be utilized is where a corporation has an information technology (IT) group having trusted devices 402 that needs to make changes to protected variables on employee devices 401. The employee devices 401 have a UEFI/BIOS firmware component 401A that is trusted. The UEFI/BIOS firmware component 401A has a public key 404 and also is the location of the protected UEFI variable 410. The employee devices 401 also have an operating system 401B that is considered untrusted because it may be or become compromised. The operating system 401B interfaces with the UEFI/BIOS firmware component 401A. The employees devices 401 also have an application 401C that is also considered untrusted for the same reason. The application 401C communicates with the operating system 401B.

The IT group establishes a secure communication channel 409, for example, using a QR code, near field communication transmission mechanism, and/or the like, to the application 401C of the employee devices 401. The secure communication channel 409 may be encrypted to assist with ensuring security of the communications. The IT group devices 402 have associated credentials 408 and a public key 404. The IT group utilizes the device 402 to make a request 407 to change the protected variable 410 of the employee devices 401C. The request 407 is transmitted to the secure and trusted location 403, which is a cloud processing location in this example. The communication channel between the IT group devices 402 and the secure and trusted location 403 is a secure channel and may be encrypted to assist with ensuring security of the communications. The credentials 408 are also transmitted to the secure and trusted location 403.

Upon verifying the IT group and device 402 are authorized to make the requested changed, for example, by verifying the credentials 408, the secure and trusted location 403 authorizes the request 407. In this example, authorizing the request 407 includes encrypting the request and signing it with a signature generated from the public key 404 and the private key 405. The encrypted signed request 406 is transmitted to the IT group device 402. The IT group device then transmits the encrypted signed request 406 to the application 401C, which sends it to the operating system 401B, which sends it to UEFI/BIOS firmware component 401A. The firmware component 401A decrypts the encrypted signed request 406 using the public key 404 and then uses the request to unlock the protected variable 410 and make the change included in the request 407.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Additionally, the term "non-transitory" includes all media except signal media.

Program code embodied on a storage medium may be transmitted using any appropriate medium, including but not limited to wireless, wireline, optical fiber cable, radio frequency, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, the method comprising:
   receiving, from a first device and at a component of a variable modification system that is separate from the first device and that stores unlocking mechanisms, a request to make a modification to content of a protected unified extensible firmware interface (UEFI) variable that is present on a second device that is different from the first device;
   verifying, using the variable modification system, that an entity utilizing the first device and requesting the modification is authorized to make modifications to the content of the protected UEFI variable, wherein the verifying comprises performing an authorization of an access of the entity to the variable modification system; and
   authorizing, responsive to verifying that the entity is an authorized entity and using an encryption scheme associated with the protected UEFI variable, the modification, wherein the authorizing results in the modification to the content of the protected UEFI, wherein the modification occurs at the second device based upon the first device forwarding a signed request resulting from the authorizing to the second device.

2. The method of claim 1, wherein the authorizing comprises signing the request utilizing a private key stored at a trusted location of the variable modification system and transmitting the signed request to the device.

3. The method of claim 2, wherein the trusted location comprises a cloud processing location.

4. The method of claim 2, wherein the signing comprises utilizing a public key corresponding to the device.

5. The method of claim 2, wherein the content is kept secret from the trusted location.

6. The method of claim 1, wherein the first device comprises an intermediary device interfacing between a trusted location of the variable modification system and the second device.

7. The method of claim 6, wherein a communication between the intermediary device and the second device is performed over an authenticated communication channel.

8. The method of claim 6, wherein the second device decrypts the signed request using a public key of the second device, the authorizing being based on the public key of second device.

9. The method of claim 1, wherein the authorizing comprises assigning a time period to the modification and wherein an attempt to execute the modification after an expiration of the time period results in a denial of the modification.

10. The method of claim 1, wherein the verifying comprises comparing credentials of the entity against an authorized entity list.

11. A system, the system comprising:
    a processor;
    a memory device that stores instructions that, when executed by the processor, causes the system to:
    receive, from a first device and at a component of a variable modification system that is separate from the first device and that stores unlocking mechanisms, a request to make a modification to content of a protected unified extensible firmware interface (UEFI) variable that is present on a second device that is different from the first device;
    verify, using the variable modification system, that an entity utilizing the first device and requesting the modification is authorized to make modifications to the content of the protected UEFI variable, wherein the verifying comprises performing an authorization of an access of the entity to the variable modification system; and
    authorize, responsive to verifying that the entity is an authorized entity and using an encryption scheme associated with the protected UEFI variable, the modification, wherein the authorizing results in the modification to the content of the protected UEFI, wherein the modification occurs at the second device based upon the first device forwarding a signed request resulting from the authorizing to the second device.

12. The system of claim 11, wherein the authorizing comprises signing the request utilizing a private key stored at a trusted location of the variable modification system and transmitting the signed request to the device.

13. The system of claim 12, wherein the trusted location comprises a cloud processing location.

14. The system of claim 12, wherein the signing comprises utilizing a public key corresponding to the device.

15. The system of claim 12, wherein the content is kept secret from the trusted location.

16. The system of claim 11, wherein the first device comprises an intermediary device interfacing between a trusted location of the variable modification system and the second device.

17. The system of claim 16, wherein a communication between the intermediary device and the second device is performed over an authenticated communication channel.

18. The system of claim 16, wherein the second device decrypts the signed request using a public key of the second device, the authorizing being based on the public key of second device.

19. The system of claim 11, wherein the authorizing comprises assigning a time period to the modification and wherein an attempt to execute the modification after an expiration of the time period results in a denial of the modification.

20. A product, the product comprising:

a computer-readable storage device that stores executable code that, when executed by a processor, causes the product to:

receive, from a first device and at a component of a variable modification system that is separate from the first device and that stores unlocking mechanisms, a request to make a modification to content of a protected unified extensible firmware interface (UEFI) variable that is present on a second device that is different from the first device;

verify, using the variable modification system, that an entity utilizing the first device and requesting the modification is authorized to make modifications to the content of the protected UEFI variable, wherein the verifying comprises performing an authorization of an access of the entity to the variable modification system; and authorize, responsive to verifying that the entity is an authorized entity and using an encryption scheme associated with the protected UEFI variable, the modification, wherein the authorizing results in the modification to the content of the protected UEFI, wherein the modification occurs at the second device based upon the first device forwarding a signed request resulting from the authorizing to the second device.

* * * * *